Patented Mar. 10, 1931

1,796,107

UNITED STATES PATENT OFFICE

OSKAR JONAS, KURT WEGER, AND GOTTHARD TREBITZ, OF BITTERFELD, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF EXTRACTING CLAY AND OTHER ALUMINOUS RAW MATERIALS

No Drawing. Application filed November 8, 1927, Serial No. 231,984, and in Germany September 29, 1926.

The present invention relates to a process of extracting clay and other aluminous raw materials by the action of mineral acids.

We have found that closed vessels hitherto believed necessary for thoroughly extracting aluminum salts from aluminum containing materials like calcined clay or similar raw materials by mineral acids may be dispensed with and can be replaced by open vessels if the extraction is performed with great charges, say for instance 20 tons or more, and if acids of sufficient strength to produce solutions of more than 100 grams alumina per liter are employed. We have observed that advantageously the reaction heat developed by the dissolution of the alumina in the acid is used for heating, the reaction heat in working on big quantities being accumulated and utilized for promoting the process. Excellent yields of extract and satisfactory reaction velocities will be attained in this process provided that the acid is made to percolate the raw material in such a manner that the acid (or the resulting solution) as well as the raw material reaches in the reaction zone a temperature of at least 105° C. Especially by employing high layers of the charge (of at least about 2 meters) a favorable increase of the temperature of the extracting liquor can be attained which can reach and even surpass its normal boiling point.

We have furthermore recognized that the essential condition for an optimum extraction i. e. for the temperature controlling the extraction resides in properly regulating the passage of the mineral acid entering the charge the latter remaining in situ during the entire process. Said regulating consists in maintaining a certain level of the liquid upon the charge during the withdrawal of the resulting salt solution and during the introduction of fresh strong acid, the criterion for regulating being that the reaction temperature of at least 105° C. will be maintained. Even if the reaction temperature surpasses the boiling point of the solution at atmospheric pressure no losses take place even when volatile acids, for instance hydrochloric acid, are used instead of nonvolatile acids like sulphuric acid, as the vapors escaping from the hotter zones are absorbed by the colder upper layers. The finished solutions are by preference withdrawn with a small content of free acid. They are practically free from silicic acid as with the present method of proceeding the silicic residue retains the position and form of the starting materials. The output of extract being considerably higher than with the usual processes, even varieties of clay hitherto considered useless for the purpose in question owing to their low content in alumina may also be utilized.

*Example*

100 tons of a calcined clay containing as chief constituents 30.1% $Al_2O_3$, 62.0% $SiO_2$, 2.97% $Fe_2O_3$, are dumped into a container having a double bottom so as to form a layer several meters in height. To start the reaction a small part (about $\frac{1}{10}$th) of the required total amount of acid corresponding to 900 tons of hydrochloric acid of 26% by weight is preheated and, together with the acid washing water from a previous extraction, flowed over the clay. After the clay is entirely covered with said diluted acid, the main quantity of the above indicated strong acid required for the extraction is gradually introduced into the container while the corresponding amount of finished extract is continuously withdrawn from below, a constant level being maintained. The supply of the hydrochloric acid and the withdrawal of extract is regulated so that the temperature in the actual reaction zone rises to at least 105° C. and up to about 120° C. By this means the greatest part of the acid spent leaves the container after one single passage yielding a clear finished liquor of chloride of aluminum, showing a content of alumina corresponding about to 120–130 grams $Al_2O_3$ per liter. The exhausted residue of clay is washed once with water and thereupon removed from the container.

In a similar way as here described in connection with ordinary clay, the process may be applied to the treatment of china clay, certain easily extractable bauxites and the like.

By the above-described method of operating as compared with the extracting processes hitherto known a considerable technical progress is realized, inasmuch as the highest output and the highest concentration of the liquors, combined with the best utilization of heat are attained.

Claims:

1. In the process of extracting clay and other aluminous raw materials by the action of mineral acids, the improvements comprising the steps of treating the material in large batches in situ, starting the reaction by flooding the charge with dilute acid in a preheated condition containing a small portion of the total acid amount required for the reaction, sustaining the reaction by introducing further amounts of acid solution in a concentration sufficiently high to yield strong solutions of alumina, simultaneously withdrawing the saturated extract so as to maintain a constant level of the liquid upon the charge, the introduction of the acid and the withdrawal of saturated extract being carried out at such a rate as to maintain a minimum temperature of 105° C. in the reaction zone by virtue of the heat of the reaction.

2. Process according to claim 1, the mineral acid being hydrochloric acid.

3. Process according to claim 1, the mineral acid being hydrochloric acid of at least 20% by weight.

4. Process according to claim 1, the charge of the container being calcined clay.

5. Process according to claim 1, applied to the treatment of batches amounting to at least ten tons.

6. In the process of extracting clay and other aluminous raw materials by the action of mineral acids, the improvements comprising the steps of treating the material in large batches in situ, starting the reaction by flooding the charge with acid washing water from a previous operation and adding in a preheated condition a small portion of the total acid amount required for the reaction, sustaining the reaction by introducing further amounts of acid solution in a concentration sufficiently high to yield strong solutions of alumina, simultaneously withdrawing the saturated extract so as to maintain a constant level of the liquid upon the charge, the introduction of the acid and the withdrawal of saturated extract being carried out at such a rate as to maintain a minimum temperature of 105° C. in the reaction zone by virtue of the heat of the reaction.

In testimony whereof we have hereunto set our hands.

OSKAR JONAS.
KURT WEGER.
GOTTHARD TREBITZ.